June 17, 1952  E. C. LEDBETTER  2,600,549
APPARATUS FOR TENSIONING STUDS
Filed April 23, 1945  2 SHEETS—SHEET 1
FIG. I.
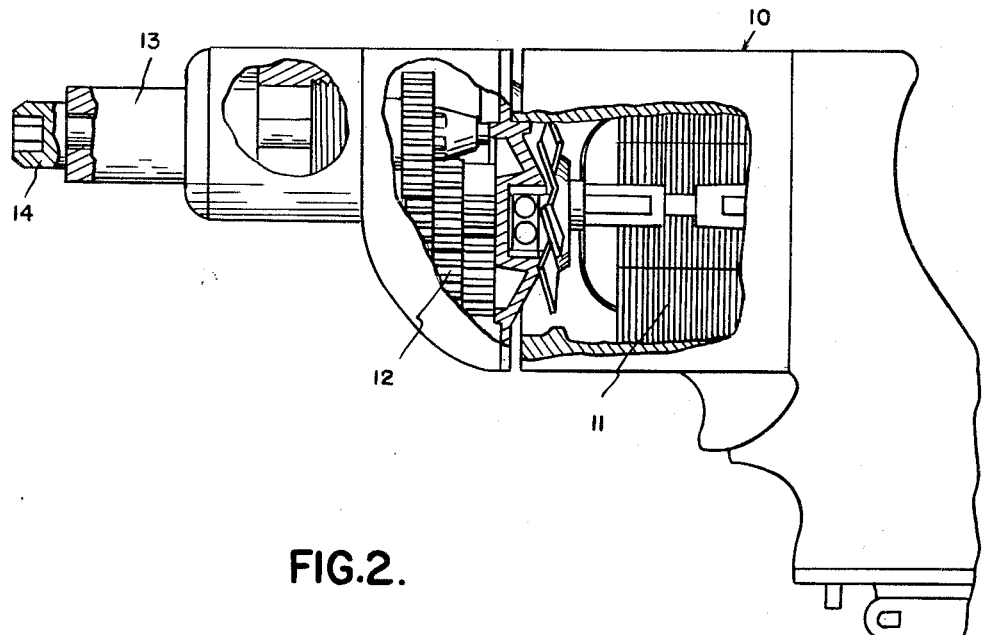
FIG. 2.
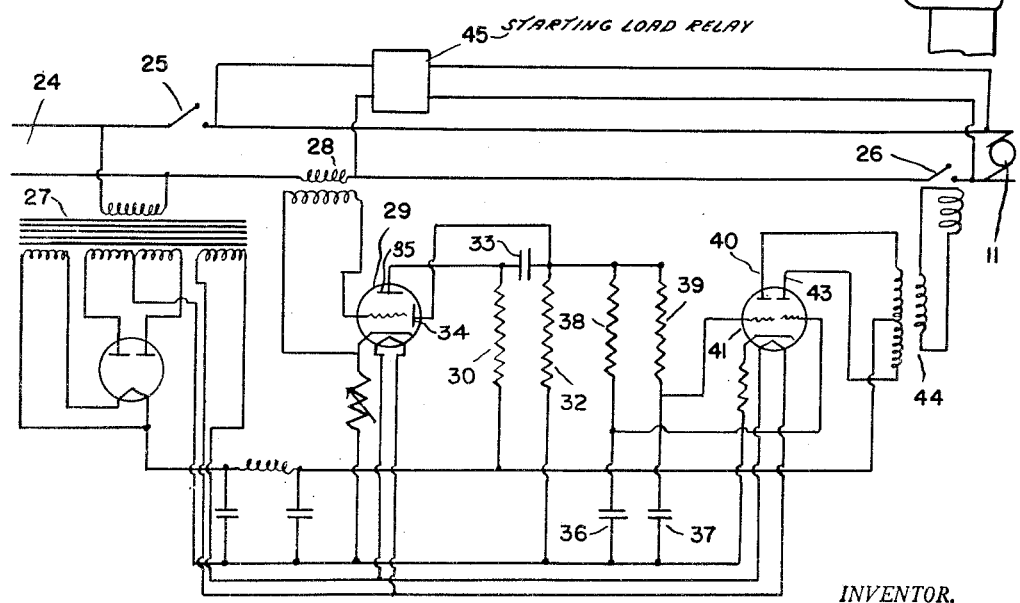
INVENTOR.
ELLSWORTH C. LEDBETTER
BY
Whittemore Hulbert & Belknap
ATTORNEYS June 17, 1952  E. C. LEDBETTER  2,600,549
APPARATUS FOR TENSIONING STUDS
Filed April 23, 1945  2 SHEETS—SHEET 2

INVENTOR.
ELLSWORTH C. LEDBETTER
BY
Whittemore Hulbert & Belknap
ATTORNEYS

Patented June 17, 1952

2,600,549

UNITED STATES PATENT OFFICE 2,600,549

APPARATUS FOR TENSIONING STUDS

Ellsworth C. Ledbetter, Detroit, Mich., assignor to Kay R. Jorgensen, Grosse Pointe Park, Mich.

Application April 23, 1945, Serial No. 589,909

3 Claims. (Cl. 81—52.4)

In the present state of the art, devices are available known as nut runners, which are used for this same general purpose, but the devices of the prior art, while useful for obtaining an approximately predetermined tension, are not sensitive enough to satisfy the requirements in many cases where a very accurate predetermined tension is essential. For example, in the aircraft engine industry, the variations allowed from the specified tension are so minute that it has heretofore been necessary to obtain the final tensioning by hand, utilizing a so-called torque wrench.

One of the objects of the present invention is to provide an automatic device which will place a predetermined tension on bolts or studs with the extreme accuracy required in the aircraft engine industry.

Another object of the invention is to construct a device capable of providing the maximum allowable tension in any threaded fastening means.

To accomplish this purpose, I have provided a device of the nut runner type provided with a control means which will automatically stop the operation of the device when the metal in the bolt or stud has reached a tension corresponding to the yield point of the metal.

The device itself and the underlying method and operation will be more readily understood by reference to the accompanying drawings, wherein:

Fig. 1 is a side view, partially in section, showing generally an apparatus of the nut runner type;

Fig. 2 is an electrical diagram showing a circuit which will automatically stop the operation of the nut running device when the yield point of the tensioned material is reached;

Figure 3:
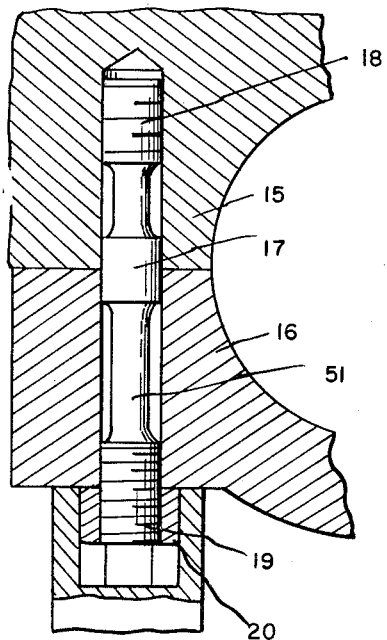
Fig. 3 is a sectional view illustrating a stud which may be tensioned by my apparatus.

Referring now to the drawings, 10 represents generally a self-contained nut running device having an electric motor 11, a step-down transmission 12, and a driven chuck 13 having a socket 14 adapted to engage the nut which is to be tightened. In Fig. 3 I have illustrated two parts 15 and 16 adapted to be secured together by a stud 17. The stud has a threaded end 18 usually provided with a relatively coarse thread and adapted to be engaged with one of the parts such as 15. The other end of the stud is provided with a relatively fine thread 19 adapted to be engaged by the nut 20. This nut may be tightened on the stud by engaging the same with the socket 14 of the nut running device and setting the device in motion by closing the starting switch.

Figure 4:
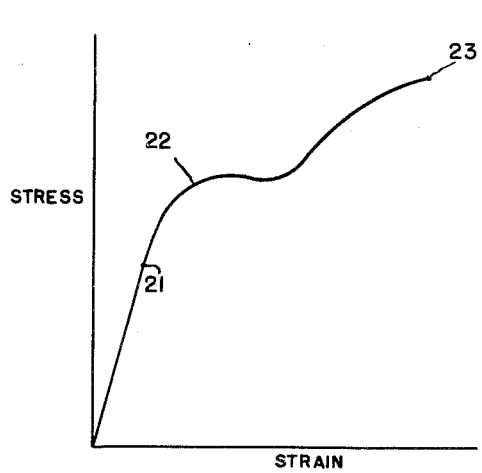
Fig. 4 is a typical stress-strain diagram of a metal commonly used in bolts and studs.

Fig. 4 is a stress-strain diagram of a metal of which the stud 17 is composed. It will be observed that the diagram shows a straight line to the point 21, which represents the elastic limit of the metal. The point 22 is the yield point of the metal where it will be observed that the curve drops slightly, following which the stress is again increased to the point 23, representing the ultimate strength of the metal.

My invention takes advantage of the fact that as the tension in the stud is increased up to the yield point 22, the force required to produce this tension in the metal is continually increasing, but when the yield point is reached, the force required is either constant, slightly dropping, or very gradually increasing, in comparison to that required previous to the yield point.

My invention in its broadest aspects is in providing means responsive to the change in rate of power or force applied when the metal reaches the yield point. I provide a mechanism which, when the yield point is reached, will automatically shut off the power line to the motor in the nut running device. This mechanism may be electronic, magnetic, mechanical, or any combination thereof, the essential point being that it comes into immediate operation to shut off the current supply by responding to the changed conditions existing when the metal reaches the yield point.

One mechanism for accomplishing this purpose is illustrated in Fig. 2 which is an electrical diagram illustrating an electronic control mechanism. In this diagram the motor 11 of the nut running device is connected by a circuit to an alternating current supply line 24, interrupted by a manually operable starting switch 25 and a normally open relay switch 26. In advance of the starting switch 25 there is connected to the supply line a transformer 27. 28 is a coil in one of the motor leads for coupling the same to the grid and cathode of a suitable vacuum tube 29. The plate output of this tube is resistance coupled through resistors 30 and 32 and condenser 33 to the diode-triode plates 34 and 35 of this tube.

Rectification takes place in the diode circuit, and a negative voltage is thereby developed on the diode side of the resistor 32. This voltage is fed into the tank condensers 36 and 37 through their respective resistors 38 and 39. The time constants of these two circuits 38—36 and 39—37 are different, due to the fact that the resistance of 39 and the capacity of 37 are larger than those of 38 and 36. Thus the potential across condenser 37 lags behind that of condenser 36 by a predetermined amount of time. The time interval is chosen, for example, as one-tenth second, so that when the left section 40 of a vacuum tube 41 reflects input to the motor 11 at a certain instant of time, the right half 43 of the vacuum tube 41 is reacting to the input as it was one-tenth second before that instant, and the opposing pulsations in the transformer 44 are unbalanced. Power will thus be developed to close the normally open relay switch 26. When the input to the motor 11 has remained constant for one-tenth second, the voltage across condenser 37 approaches that of condenser 36, causing the pulsating voltages across transformer 44 to balance and the relay switch 26 to resume its normally open position.

While I have given the time interval above as one-tenth second, it will be understood that this is only by way of example, and the time interval may be suitably chosen to have other values, depending upon the particular conditions of operation. The values are chosen so that the relay switch 26 is closed while the power to the motor 11 is increasing due to increased load and is opened when the rate of power increase changes, due to the fact that the yield point of the metal in the stud has been reached.

A starting load relay 45 is connected across the line to the motor 11 between the starting switch 25 and the motor 11, the function of which is to by-pass the input current to the motor at the instant of starting and to cut out and allow the electronic circuit to function when the motor is free running and to continue to function during the increased input power to the motor until the relay switch 26 is opened, as above described.

Figure 5:
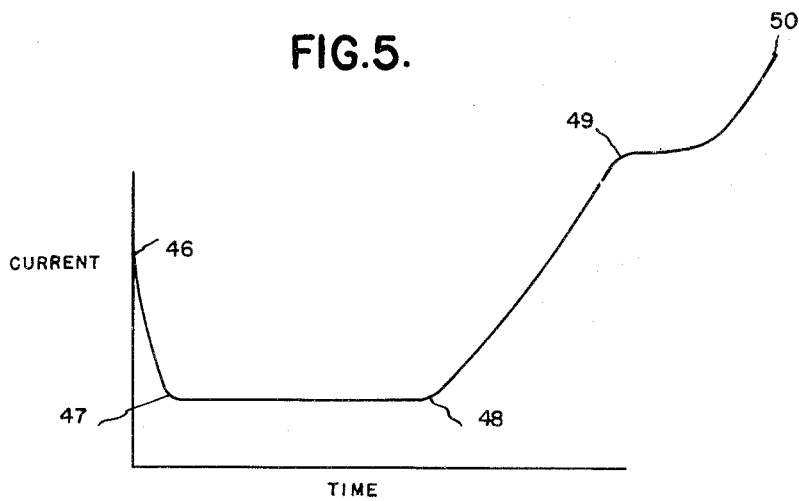
Fig. 5 is a graph illustrating the functioning of the control circuit.

The operation of the device is further illustrated by the power curve of Fig. 5. At the instant of starting, the current has the high value indicated at 46, which drops off in a short time to the value given at 47, where the motor is free running. As soon as the nut begins to tighten on the thread of the stud, represented at point 48, the input power begins to increase and continues to do so until the yield point of the tensioned material is reached, which is indicated at point 49. Here the power remains constant or drops off slightly for an interval sufficient to open the relay switch 26, as previously described. Were it not for the opening of the relay switch, the power would again rise until the ultimate strength of the tensioned material was reached, as indicated at the point 50, where the tensioned material would fail completely.

It should be understood that my invention is particularly designed for tensioning studs which are relieved or undercut, as shown at 51 in Fig. 3, in order that greater strength may be provided in the threaded ends 18 and 19 than in the undercut body section. This is, of course, to prevent failure in the threaded ends prior to the stressing of the undercut sections to the yield point of the metal.

It should also be understood that the electronic circuit illustrated in Fig. 2 is given merely by way of example and that other electrical circuits may be used, provided they are responsive to the change in rate of power input to the motor 11, due to the fact that the yield point of the metal under tension is reached.

My invention also contemplates other equivalent means for automatically shutting off the driving power of the nut runner when the yield point of the metal has been reached, by taking advantage of the decreased stress which occurs at that time.

What I claim as my invention is:

1. An apparatus for tensioning a fastening member having a threaded engagement with a nut, which comprises an electrically driven torque applying motor mechanically engageable with said nut, electronic means for maintaining the electric input to said motor when said fastening member is within its elastic limit, and electronic means responsive to the change in electric input when the yield point of said fastening member is reached for automatically opening the input circuit to said electrically driven torque applying motor.

2. An apparatus for tensioning a fastening member having a threaded engagement with a nut, comprising a socket member engageable with said nut, an electric motor for driving said socket member, a relay in the input circuit of said motor, and electronic means operable to maintain said relay closed during increasing input to said motor and to open said relay when the input to said motor ceases to increase.

3. An apparatus for tensioning a fastening member having a threaded engagement with a nut, which comprises a nut-engaging member, an electric motor rotatably connected to said member and electrically connected to a power input circuit, a relay switch in said power input circuit, electronic means for maintaining said relay switch closed during increasing current input to said motor and electronic means electrically coupled to said input circuit adapted to open said relay switch when the current input ceases to increase.

ELLSWORTH C. LEDBETTER.

REFERENCES CITED

The following references are of record in the file of this patent:

UNITED STATES PATENTS

| Number | Name | Date |
| --- | --- | --- |
| 1,649,060 | Decker | Nov. 15, 1927 |
| 1,864,549 | Paul | June 28, 1932 |
| 1,867,280 | Rippl | July 12, 1932 |
| 1,970,179 | Miller | Aug. 14, 1934 |
| 2,228,589 | Backes | Jan. 14, 1941 |
| 2,284,843 | Purifoy | June 2, 1942 |
| 2,384,399 | Reynolds | Sept. 4, 1945 |
| 2,394,386 | Husband | Feb. 5, 1946 |
| 2,409,385 | Pletcher | Oct. 15, 1946 |
| 2,415,552 | Broecker | Feb. 11, 1947 |